United States Patent [19]

Miyashita et al.

[11] Patent Number: 5,548,426
[45] Date of Patent: Aug. 20, 1996

[54] LIQUID CRYSTAL DISPLAY DEVICE

[75] Inventors: Takashi Miyashita, Hochioji; Yoshinaga Miyazawa, Fussa; Zenta Kikuchi, Hamura, all of Japan

[73] Assignee: Casio Computer Co., Ltd., Tokyo, Japan

[21] Appl. No.: 78,395

[22] Filed: Jun. 16, 1993

[30] Foreign Application Priority Data

| Jun. 18, 1992 | [JP] | Japan | 4-182879 |
| Jun. 18, 1992 | [JP] | Japan | 4-182880 |
| Jun. 19, 1992 | [JP] | Japan | 4-184758 |
| Jul. 8, 1992 | [JP] | Japan | 4-203199 |
| Jul. 10, 1992 | [JP] | Japan | 4-206137 |

[51] Int. Cl.$^6$ ............ G02F 1/1335; G02F 1/1347
[52] U.S. Cl. ............ 359/73; 359/102; 359/99; 359/53
[58] Field of Search ............ 359/53, 63, 73, 359/99, 100, 101, 102, 105, 106; 428/1

[56] References Cited

U.S. PATENT DOCUMENTS

| 4,443,065 | 4/1984 | Funada et al. | 359/53 |
| 5,119,216 | 6/1992 | Wada et al. | 359/53 |
| 5,124,824 | 6/1992 | Kozaki et al. | 359/73 |
| 5,142,393 | 8/1992 | Okumura et al. | 359/73 |
| 5,241,408 | 8/1993 | Ishikawa et al. | 359/73 |
| 5,308,535 | 5/1994 | Scheuble et al. | |
| 5,326,496 | 7/1994 | Iida et al. | 359/73 |

FOREIGN PATENT DOCUMENTS

| 0465107A3 | 1/1992 | European Pat. Off. . |
| 0524028A1 | 1/1993 | European Pat. Off. . |
| WO90/16005 | 12/1990 | WIPO . |

OTHER PUBLICATIONS

H. Hatoh et al; "Improvement of Viewing Angle Characteristics In a Twisted–Nematic Liquid–Crystal Display By Using a Cholesteric Liquid–Crystal Compensation Layer"; Apr. 13, 1992; pp. 1806–1808; Apply. Phys. Lett. 60 (15), No. 15.
Patent Abstracts of Japan, vol. 16, No. 390 & JP-A-04127125 (Casio).
Patent Abstracts of Japan, vol. 13, No. 508 & JP-A-01206318 (Matsushita).
Patent Abstracts of Japan, vol. 12, No. 25 & JP-A-62180328 (Konishiroku Photo).
Patent Abstracts of Japan, vol. 16, No. 139 & JP-A-04000412 (Ricoh).
Patent Abstracts of Japan, vol. 14, No. 512 & JP-A-02214815 (Seiko Epson).

*Primary Examiner*—William L. Sikes
*Assistant Examiner*—Kenneth Parker
*Attorney, Agent, or Firm*—Frishauf, Holtz, Goodman, Langer & Chick

[57] ABSTRACT

A polarizer is arranged on the incident side of a TN type liquid crystal cell in which the arrangement of liquid crystal molecules is twist-aligned through substantially 90° in a direction from one substrate to the opposite substrate and the value of a product $\Delta n_c \cdot d_c$ of a refractive index anisotropy $\Delta n_c$ and a gap $d_c$ is set within a range of 300 to 600 nm, and an analyzer is arranged on the exit side of the liquid crystal cell. A twist-aligned retardation plate, in which the arrangement of polymer molecules is twist-aligned through 90° in a direction opposite to the twist direction of the twist orientation of the liquid crystal molecules and the value of $\Delta n \cdot d$ ranges between 100 and 600 nm, is arranged between the liquid crystal cell and the analyzer.

18 Claims, 14 Drawing Sheets

LIQUID CRYSTAL DISPLAY DEVICE

BACKGROUND OF THE INVENTION

1. Field of the Invention

The present invention relates to a liquid crystal display device in which a twist-aligned retardation plate is arranged with a liquid crystal cell using a nematic liquid crystal.

2. Description of the Related Art

Liquid crystal display devices are extensively used as displays for office automation equipments. Such a display device is required to provide a high-definition display and hence requires a large number of pixels and high time-division driving, and also requires, as display characteristics, a high contrast and a wide view angle. To meet these requirements, as display devices for personal computers and the like, a simple matrix type STN (super twisted nematic) liquid crystal display device or an active matrix type TFT-TN (thin film transistor-twisted nematic) liquid crystal display device, which can be driven in a high time-division manner and has a relatively high contrast among other liquid crystal display devices, is generally used.

The simple matrix type STN liquid crystal display device comprises a pair of substrates arranged to oppose each other with a predetermined distance between them, electrodes arranged on the opposing inner surfaces of the pair of substrates such that they cross each other at a right angle, orientation films formed to cover the electrode formation surfaces to orient liquid crystal molecules in a predetermined direction, a liquid crystal material sealed between these orientation films, and a pair of polarizing plates arranged outside the pair of substrates so as to sandwich them. In the liquid crystal material sealed between the pair of orientation films, liquid crystal molecules near the orientation films are arranged in a predetermined orientation direction by the orientation control force of the orientation films; that is, the arrangement of the liquid crystal molecules is twist-aligned at an angle around 240° in a direction from one substrate to the other.

The active matrix type TFT-TN liquid crystal display device comprises a twisted nematic (TN) liquid crystal cell. That is, a common electrode is formed on one substrate, and scan lines and signal lines are formed to cross each other on the other substrate. A pixel electrode and a thin-film transistor (TFT) for driving are arranged at each intersection of these lines. A liquid crystal material in which the arrangement of liquid crystal molecules is twist-aligned at an angle of approximately 80° to 120° is sealed between the pair of substrates.

These liquid crystal display devices are driven in a time-division driving manner, changing the orientation of liquid crystal molecules in accordance with an electric field applied between the opposing electrodes, and controlling transmission and interruption of light by the optical action of the liquid crystal layer sandwiched between the pair of polarizing plates, thereby presenting a desired display.

In the STN liquid crystal display device, however, the twist angle of the arrangement of liquid crystal molecules is increased to allow high time-division driving, and the effect of birefringence of liquid crystal is used to increase the visual contrast, resulting in a problem of coloring of a display. In addition, the viewing angle is not sufficiently wide, and displayed colors change depending on the visual angle.

The TFT-TN liquid crystal display device, on the other hand, can be driven by applying a static voltage to each pixel and therefore has a higher contrast and a wider viewing angle than those of the simple matrix type liquid crystal display device. In displaying halftones in a multi-gradation-level display, however, the reversal of brightness occurs depending on the visual angle, disturbing the multi-gradation-level display.

FIGS. 1A to 1D show equi-Y value (value of brightness) curves for four gradation levels in a conventional TFT-TN liquid crystal display device. In a liquid crystal cell of this liquid crystal display device, the arrangement of liquid crystal molecules is twist-aligned counterclockwise through 90° in the direction of propagation of light, a product $\Delta n_c \cdot d_c$ of a refractive index anisotropy $\Delta n_c$ and a gap $d_c$ is 403 nm, a ratio $d_c/p_c$ of the gap $d_c$ to a natural pitch $p_c$ is 0.05, and a pretilt angle is 3°. Voltages for realizing the four gradation levels are a bright-state voltage of 1.5 V, a dark-state voltage of 6.0 V, and two halftone voltages which correspond to two intermediate Y values obtained by equally dividing the Y value upon application of 1.5 V into three portions; that is, in the ascending order of voltage, first-gradation-level voltage V1=1.50 [V], second-gradation-level voltage V2=2.06 [V], third-gradation-level voltage V3=2.43 [V], and fourth-gradation-level voltage V4=6.0 [V]. Referring to FIGS. 1A to 1D, concentric circles represent visual angles tilted by 10°, 20°, 30°, 40°, and 50°, from the inside, with respect to the direction of normal to the substrates of the liquid crystal display device. A closed square (■) represents a Y value of 10, an open square (□) represents a Y value of 20, and a closed triangle (▲) represents a Y value of 30. An arrow R indicates the orientation direction on the substrate on the light incident side of a liquid crystal cell. The azimuth of the display surface is represented by an angle (to be referred to as an angle of azimuth hereinafter) measured about the center of the display surface with reference to the light-incident side orientation direction R. As an example, the angle of azimuth in the upward direction on the display surface is 135°. As is apparent from FIGS. 1A to 1D, the upper portion is bright, and the lower portion is dark, at any gradation-level voltage.

FIGS. 2A to 2C illustrate equi-contrast curves (Y1/Y2, Y2/Y3, and Y3/Y4) each obtained by the Y value ratio of neighboring gradation levels. Referring to FIGS. 2A to 2C, concentric circles represent visual angles tilted by 10°, 20°, 30°, 40°, and 50°, from the inside, with respect to the direction of normal to the substrates of the liquid crystal display device. A closed circle (●) represents a contrast of 1 or less, a closed square (■) represents a contrast of 10, an open square (□) represents a contrast of 20, a closed triangle (▲) represents a Y value of 50, and an open triangle (△) represents a contrast of 100. As can been seen from FIGS. 2B and 2C, regions (hatched portions in FIGS. 2B and 2C, which will be referred to as halftone reversal regions hereinafter) with a contrast of 1 or less appear between the second and the third gradation levels and between the third and the fourth gradation levels. The halftone reversal region in the upper portion of FIG. 2B is produced because the third gradation level is brighter than the second gradation level. The halftone reversal regions in the lower right and left portions of FIG. 2C are produced because a leakage of light occurs at the fourth-gradation-level voltage. This reversal of brightness in a halftone display disturbs a correct gradation display and hence is a serious problem of the liquid crystal display device.

SUMMARY OF THE INVENTION

It is an object of the present invention to provide a liquid crystal display device which is improved in terms of display coloration, and capable of correctly displaying halftones regardless of the visual angle by preventing the reversal of brightness in a multi-gradation-level display.

In order to achieve the above object, a liquid crystal display device of the present invention comprises a pair of substrates having surfaces which oppose each other and on which electrodes crossing each other and orientation films covering the electrodes and having undergone orientation processing in predetermined directions are formed, a nematic liquid crystal layer which is present between the orientation films and in which the arrangement of liquid crystal molecules is twist-aligned within a predetermined range of angles in a direction from one substrate to the other, a pair of polarizing plates arranged outside the pair of substrates to sandwich the substrates, and at least one twist-aligned retardation plate which is arranged between the pair of polarizing plates and in which the arrangement of polymer molecules is twist-aligned over a predetermined range of angles in a direction from one surface to the other.

With the above arrangement of the liquid crystal display device, the twist-aligned retardation plate compensates for the differences in retardation between light components with different wavelengths contained in light transmitted through the liquid crystal cell and the differences in retardation between light components transmitted perpendicularly and obliquely through the liquid crystal cell, thereby improving coloring in a display. This can also suppress the reversal of brightness in displaying halftones in a multi-gradation-level display. As a result, a correct gradation can be stably displayed in a gradation display regardless of the visual angle.

In the above liquid crystal display device, the nematic liquid crystal layer is either a twisted nematic (to be referred to as TN hereinafter) liquid crystal layer which has the arrangement of twist-aligned liquid crystal molecules, the twist angle of which is about 80 to 120 degrees or a super twisted nematic (to be referred to as STN hereinafter) liquid crystal layer which has the arrangement of twist-aligned liquid crystal molecules, the twist angle of which is about 220 to 260 degrees.

When the nematic liquid crystal layer is the TN liquid crystal layer, the product Δn.d of a refractive index anisotoropy Δn and a plate thickness d of the twist-aligned retardation plate is either positive or negative.

When a twist-aligned retardation plate with a positive Δn.d is to be used, a twist-aligned retardation plate of a horizontal orientation type in which polymer molecules are arranged substantially parallel to the surface of the plate and the arrangement of the polymer molecules is twist-aligned by a predetermined angle in a direction from one surface to the other is used. The Δn.d of this plate preferably ranges between 50 and 600 nm. In this case, one or two of these twist-aligned retardation plates are arranged between a pair of polarizing plates. When a single twist-aligned retardation plate is to be used, it is preferred that the arrangement of molecules be twist-aligned in a direction opposite to the twist direction of the twist orientation of the liquid crystal layer at substantially the same angle, 80 to 120 degrees. When two twist-aligned retardation plates are to be used, the arrangement of molecules in one twist-aligned retardation plate is twist-aligned in substantially the same direction as the twist direction of the twist orientation of the nematic liquid crystal layer at substantially the same angle, whereas the arrangement of molecules in the other twist-aligned retardation plate is twist-aligned in a direction opposite to the twist direction of the twist orientation of the nematic liquid crystal layer at substantially the same angle. When two twist-aligned retardation plates are to be used, both the plates may be arranged between the liquid crystal cell and one of the polarizing plates, or they may be arranged one on each side of the liquid crystal cell.

when a twist-aligned retardation plate with a negative Δn.d is to be used, this phase plate may be either a twist-aligned retardation plate of a horizontal orientation type as described above or a twist-aligned retardation plate of a tilted orientation type in which polymer molecules are tilted with respect to the surface of the phase plate and the arrangement of the polymer molecules is twist-aligned at a predetermined angle in a direction from one surface to the other.

When a twist-aligned retardation plate having a negative Δn.d and a horizontal molecular orientation is to be used, it is preferable to use a twist-aligned retardation plate in which a product ΔN.d of an effective refractive index anisotropy ΔN which is given by:

$$\Delta N = n_o - \sqrt{\{(n_e^2 + n_o^2)/2\}}$$

and a plate thickness d is −30 to −600 nm and the twist angle of the twist orientation of molecules is five turns (360°×5= 1,800°) or more. When a twist-aligned retardation plate with a tilted molecular orientation is to be used, a product Δn.d of a refractive index anisotropy Δn and a plate thickness d is preferably −300 to −600 nm.

When the nematic liquid crystal layer is the STN liquid crystal layer, on the other hand, a product $\Delta n_c.d_c$ of a refractive index anisotropy $\Delta n_c$ and a layer thickness $d_c$ preferably ranges from 700 to 800 nm. A twist-aligned retardation plate to be arranged in such a liquid crystal cell is preferably one having a value of Δn.d that is 0.9 to 0.95 times the value of $\Delta n_c.d_c$ of the nematic liquid crystal layer or one in which the arrangement of molecules is twist-aligned in a direction opposite to that of the twist orientation of the nematic liquid crystal layer at substantially the same twist angle.

In addition, the liquid crystal display device of the present invention employs a twist-aligned retardation plate in which the arrangement of polymer molecules is twist-aligned in a direction opposite to that of the twist orientation of the nematic liquid crystal layer at substantially the same angle, regardless of whether the nematic liquid crystal is of the TN or STN type.

Furthermore, the liquid crystal display device of the present invention uses at least one twist-aligned retardation plate in which polymer molecules are arranged nearly perpendicularly with respect to the surface of the plate and the arrangement of the polymer molecules is twist-aligned over a predetermined range of angles in a direction from one surface to the other, regardless of whether the nematic liquid crystal is of the TN or STN type.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The embodiments of the present invention will be described in detail below with reference to FIGS. 3 to 16.

1st Embodiment

Figure 1A:
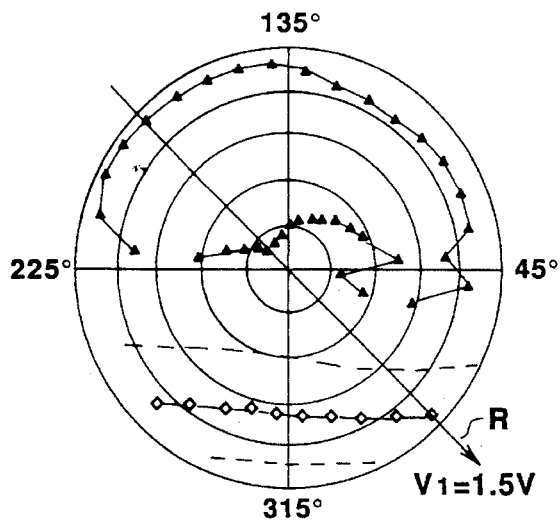
FIGS. 1A, 1B, 1C, and 1D are views showing equi-Y value curves at voltages of four gradation levels in a conventional liquid crystal display device.
Figure 1B:
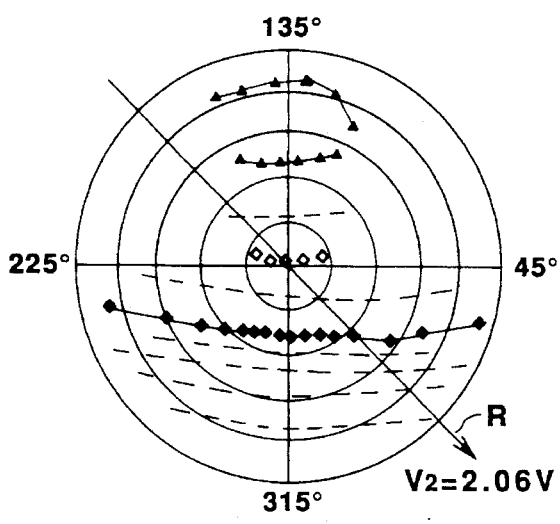
Figure 1C:
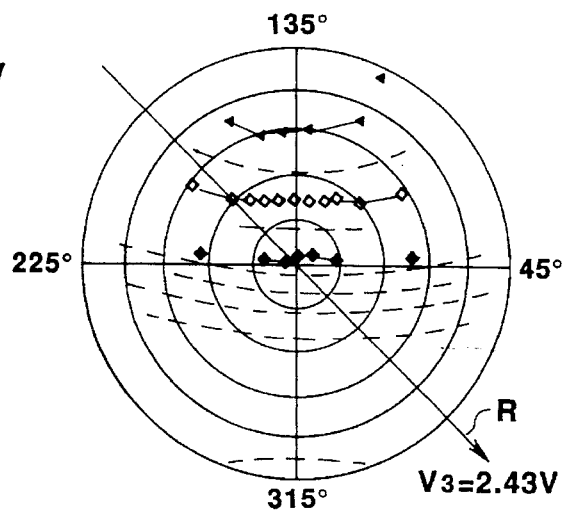
Figure 1D:
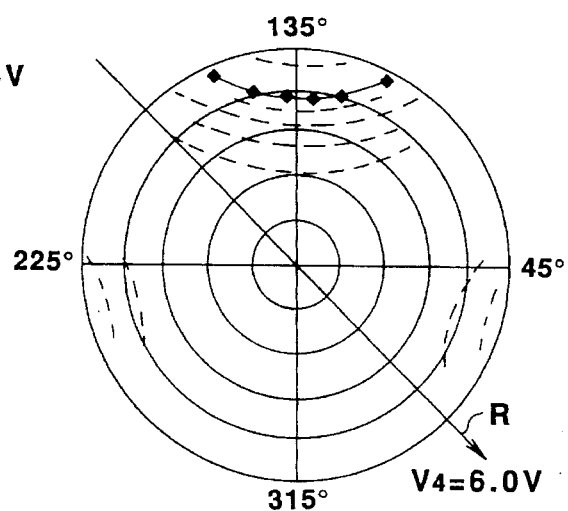
Figure 2A:
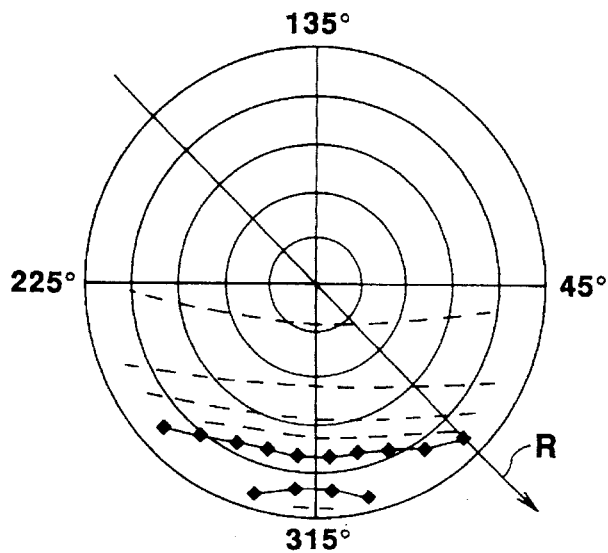
FIGS. 2A, 2B, and 2C are views showing equi-contrast curves representing contrasts between voltages of adjacent gradation levels shown in the equi-Y value curves in the conventional liquid crystal display device shown in FIGS. 1A to 1D.
Figure 2B:
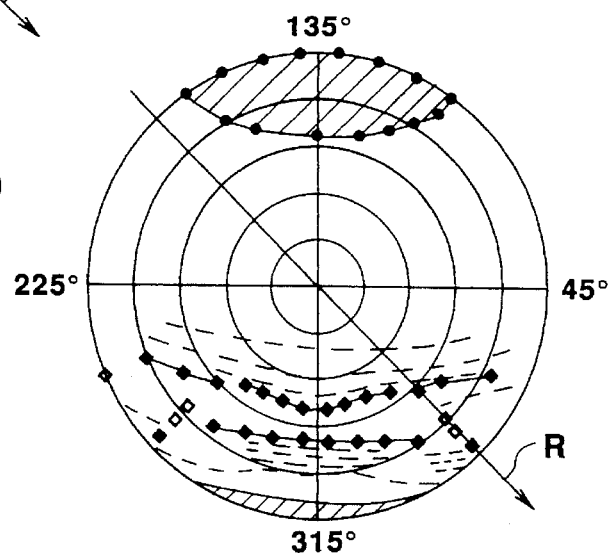
Figure 2C:
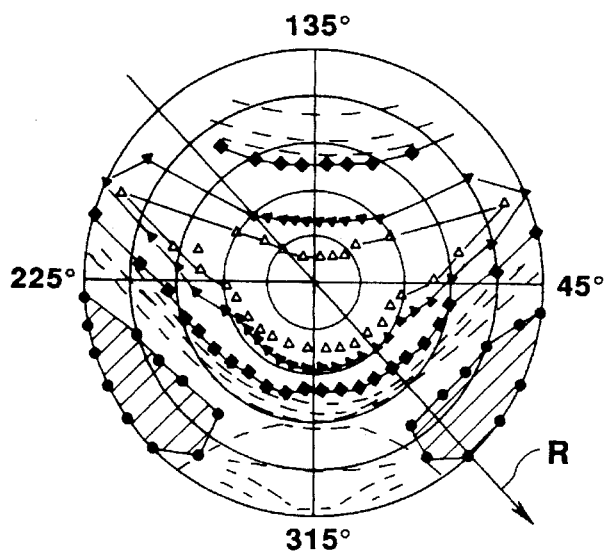
Figure 3:
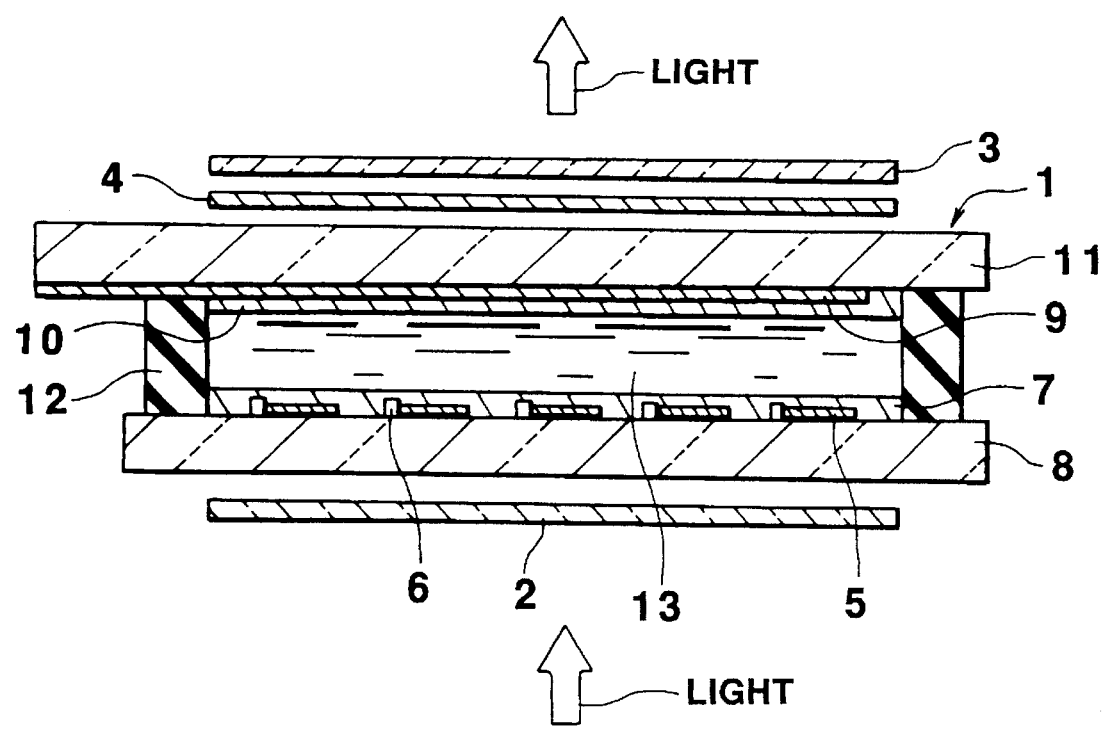
FIG. 3 is a sectional view showing a liquid crystal display device according to the first embodiment of the present invention.
Figure 4:
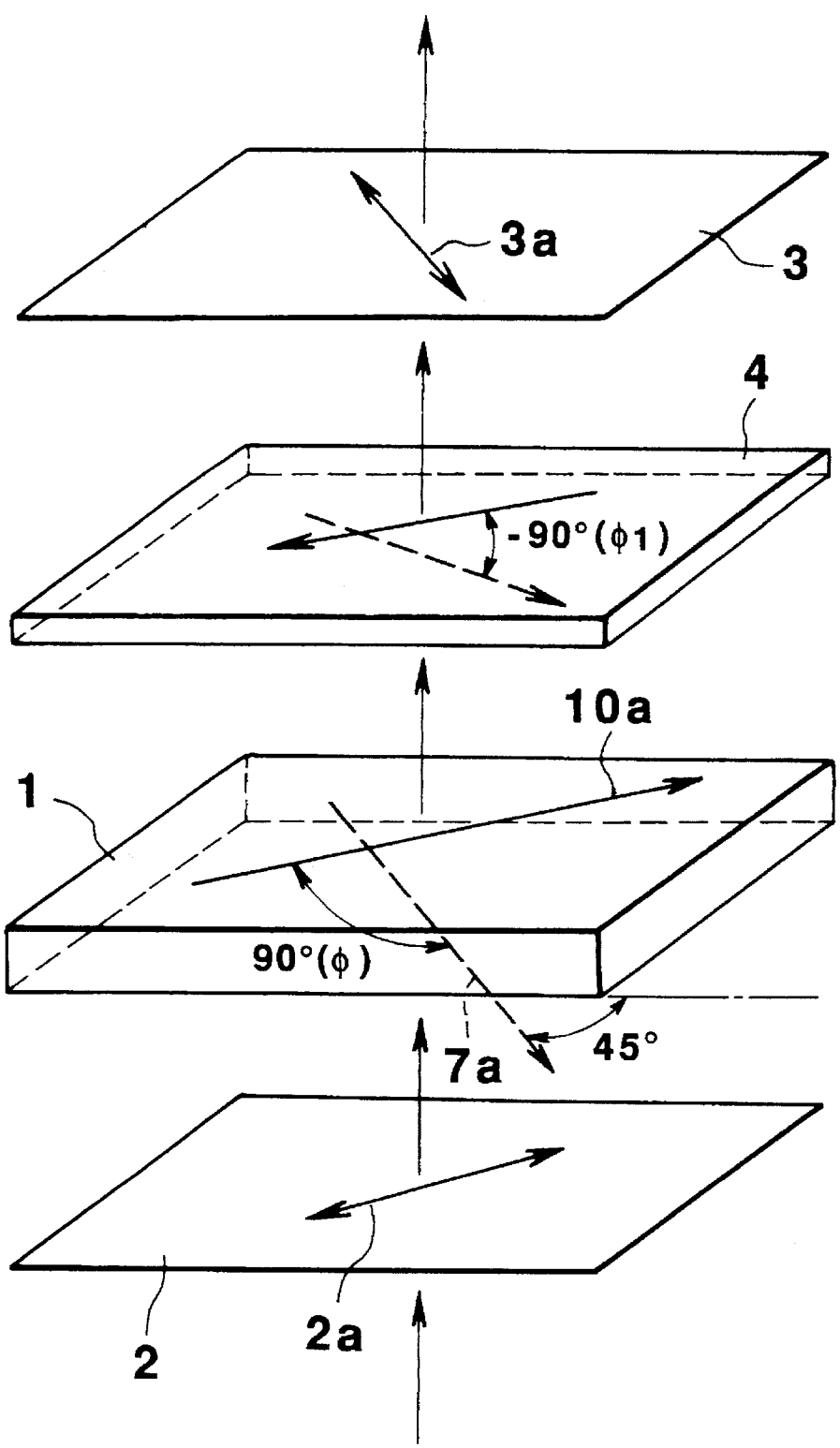
FIG. 4 is an exploded perspective view showing the liquid crystal display device of the first embodiment shown in FIG. 3.

In the first embodiment of the present invention, a single twist-aligned retardation plate with a positive product $\Delta n.d$ of a refractive index anisotropy $\Delta n$ and a thickness d is arranged on one side of a liquid crystal cell. FIGS. 3 and 4 are a sectional view and an exploded perspective view, respectively, showing the arrangement of the first embodiment. Referring to FIGS. 3 and 4, a polarizer 2 is arranged on the incident side of a twisted nematic type liquid crystal cell 1, and an analyzer 3 is arranged on the exit side of the liquid crystal cell 1. A twist-aligned retardation plate 4 in which the arrangement of molecules is twist-aligned in the same manner as the twisted nematic type liquid crystal layer is arranged between the liquid crystal cell 1 and the analyzer 3.

The liquid crystal cell 1 comprises a lower substrate 8, an upper substrate 11, a seal member 12, and a liquid crystal material 13. The lower substrate 8 has pixel electrodes 5, thin-film transistors (TFT) 6 formed in a one-to-one correspondence with the pixel electrodes 5, and an orientation film 7 covering the pixel electrodes 5 and the TFTs 6. The upper substrate 11 has counter electrodes 9 opposing the pixel electrodes 5 and an orientation film 10 covering the counter electrodes 9. The seal member 12 couples the lower and upper substrates 8 and 11 with a predetermined space between them. The liquid crystal material 13 is sealed in a region surrounded by the substrates 8 and 11 and the seal member 12 and has a ratio d/p of a gap d to a natural pitch p of 0.05. Note that light is incident on the liquid crystal cell 1 from below in the plane of the paper, so the lower and upper substrates 8 and 11 will be referred to as an incident-side substrate and an exit-side substrate, respectively, hereinafter.

The orientation films 7 and 10 formed on the opposing surfaces of the incident-side and exit-side substrates 8 and 11, respectively, are subjected to orientation processing, such as rubbing. As shown in FIG. 4, the orientation film 7 on the incident-side substrate 8 is oriented in a direction 7a with a tilt angle of about 45° in a direction from the upper left to the lower right position with respect to the horizontal line when the liquid crystal cell 1 is viewed from the front. The orientation film 10 on the exit-side substrate 11 opposing the incident-side substrate 8 is oriented in a direction 10a which is rotated counterclockwise through nearly 90°, when viewed from the exit side, with respect to the orientation direction 7a (to be referred to as an incident-side orientation direction hereinafter) of the incident-side substrate 8. As a result of this orientation processing, the arrangement of liquid crystal molecules of the liquid crystal material 13 is twist-aligned clockwise through substantially 90° ($\phi$) when viewed from the exit side and have a pretilt angle of about 3°. The value of a product $\Delta n.d$ of a gap d and a refractive index anisotropy $\Delta n$ of the liquid crystal cell 1 is set between 300 and 600 nm (measurement wavelength: 589 nm).

The polarizer 2 is arranged such that its transmission axis 2a is nearly perpendicular to the incident-side orientation direction 7a of the liquid crystal cell 1. The analyzer 3 is arranged such that its transmission axis 3a is nearly perpendicular to the transmission axis 2a of the polarizer 2.

The twist-aligned retardation plate 4 consists of a polymer material, and the arrangement of the polymer molecules is twist-aligned in the same manner as the twisted nematic type liquid crystal layer. That is, the polymer molecules constituting the twist-aligned retardation plate 4 are oriented substantially parallel with respect to one surface while gradually changing the major-axis direction toward the opposite surface. As a result, the arrangement of the polymer molecules is twist-aligned over a predetermined range of angles as a whole.

The twist-aligned retardation plate 4 of this embodiment consists of an organic polymer film and has a structure in which, for example, a polymer liquid crystal film (liquid crystal polymer) is sandwiched between protective films consisting of cellulose triacetate (TAC) or the like. A twist angle $\phi_1$ of molecules of the twist-aligned retardation plate 4 is set within the range of 0° to ±360° C. in a twist direction opposite to that of the twist angle $\phi$ of the liquid molecules in the liquid crystal material 13 at substantially the same angle. That is, the twist angle $\phi_1$ of the twist-aligned retardation plate 4 of this embodiment is −90° ($\phi_1=-\phi$) when viewed from the light-exit side. In addition, the value of a product $\Delta n.d$ of a refractive index anisotropy $\Delta n$ and a gap d of the twist-aligned retardation plate 4 ranges between 50 and 600 nm, preferably 100 and 600 nm (measurement wavelength: 589 nm).

In the TN type liquid crystal display device with the above arrangement, the twist-aligned retardation plate 4 in which the arrangement of the molecules is twist-aligned in a direction opposite to the twist direction of the liquid crystal molecules of the liquid crystal material 13 at the same angle of 90° is arranged between the liquid crystal cell 1 and the analyzer 3. Therefore, this twist-aligned retardation plate 4 compensates for the differences in retardation between light components transmitted perpendicularly and obliquely through the liquid crystal cell 1, suppressing the reversal of brightness in halftones in a multi-gradation-level display. Consequently, a correct gradation can be stably displayed in the multi-gradation-level display regardless of the visual angle. In addition, the twist-aligned retardation plate 4 has the structure in which the polymer liquid crystal film that is twist-aligned over the range of 0° to ±360° is sandwiched between the protective films. This facilitates the manufacture of the twist-aligned retardation plate and can also decrease the thickness of the plate, thereby achieving miniaturization of the overall liquid crystal display device.

Note that although the twist-aligned retardation plate 4 is arranged between the liquid crystal cell 1 and the analyzer 3 in this embodiment, the twist-aligned retardation plate 4 can also be arranged between the liquid crystal cell 1 and the polarizer 2. Note also that the transmission axis 2a of the polarizer 2 is set perpendicularly to the incident-side orientation direction 7a, but the transmission axis 2a can also be set parallel to the incident-side orientation direction 7a.

2nd Embodiment

In the second embodiment of the present invention, two twist-aligned retardation plates both having positive $\Delta n.d$ values are arranged on one side of a liquid crystal cell. Note that in the second and the subsequent embodiments, the same reference numerals as in the first embodiment denote the same parts and a detailed description thereof will be omitted.

Figure 5:
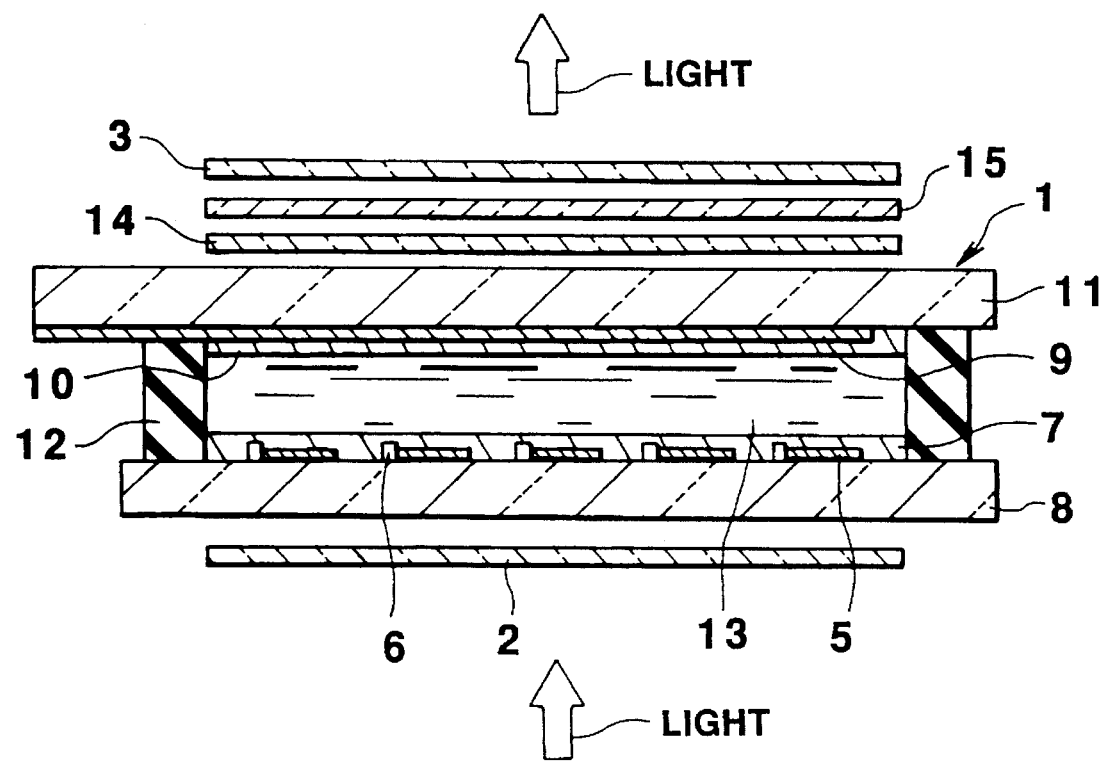
FIG. 5 is a sectional view showing a liquid crystal display device according to the second embodiment of the present invention.
Figure 6:
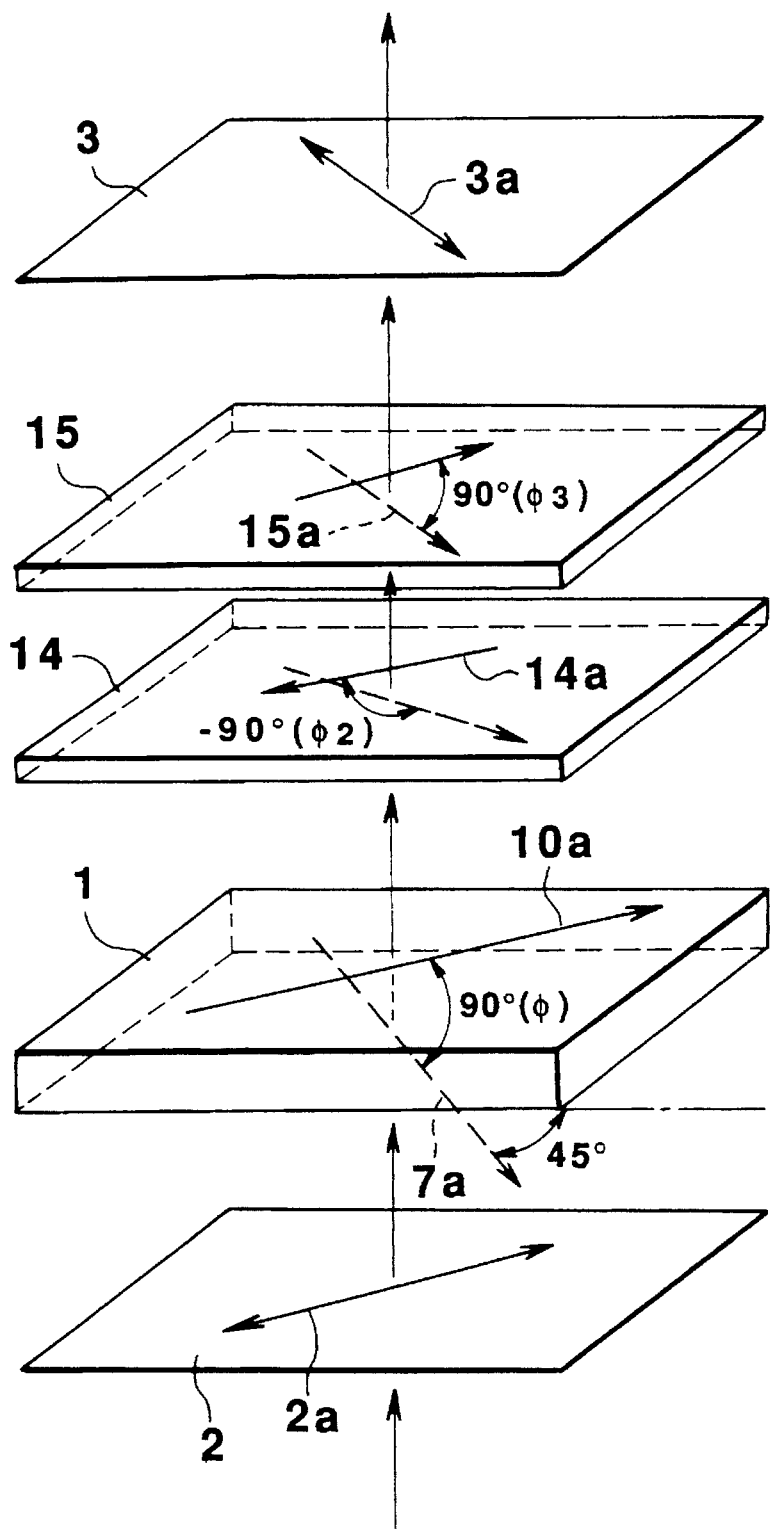
FIG. 6 is an exploded perspective view showing the liquid crystal display device of the second embodiment shown in FIG. 5.

FIGS. 5 and 6 are a sectional view and an exploded perspective view, respectively, showing a liquid crystal display device according to the second embodiment. In this liquid crystal display device, similar to that of the first embodiment, a polarizer 2 is arranged on the incident side of a liquid crystal cell 1, and an analyzer 3 is arranged on the exit side of the liquid crystal cell 1. Two twist-aligned retardation plates 14 and 15 are arranged between the liquid crystal cell 1 and the analyzer 3 in the order named.

As shown in FIG. 6, the first twist-aligned retardation plate 14 adjacent to the liquid crystal cell 1 consists of an organic polymer film in which the arrangement of molecules is twist-aligned by about 90° ($\phi_2=-\phi=-90°$) in a direction opposite to the twist direction of the twist orientation of liquid crystal molecules of a liquid crystal material 13. For example, the first twist-aligned retardation plate 14 has a structure in which a polymer liquid crystal film (liquid crystal polymer) is sandwiched between protective films consisting of cellulose triacetate (TAC) or the like. In the second twist-aligned retardation plate 15 adjacent to the analyzer 3, the arrangement of molecules is twist-aligned by about 90° ($\phi_3=-\phi_2=90°$) in a direction opposite to the twist direction of the twist orientation of the molecules in the first twist-aligned retardation plate 14, i.e., in the same direction as the twist direction of the twist orientation of the liquid crystal molecules. Similar to the first twist-aligned retardation plate 14, the second twist-aligned retardation plate 15 has a structure in which a polymer liquid crystal film (liquid crystal polymer) is sandwiched between protective films consisting of cellulose triacetate (TAC) or the like. In this arrangement, a major-axis direction 14a of the molecules on the exit-side surface of the first twist-aligned retardation plate 14 and a major-axis direction 15a of the molecules on the incident-side surface of the second twist-aligned retardation plate 15 are so set as to cross each other at an almost right angle. The value of $\Delta n.d$ of each of the twist-aligned retardation plates 14 and 15 is set within a range of 100 to 600 nm (measurement wavelength: 589 nm).

In this liquid crystal display device with the above arrangement, as in the first embodiment, the first and second twist-aligned retardation plates 14 and 15 arranged between the liquid crystal cell 1 and the analyzer 3 compensate for the differences in retardation between light components transmitted perpendicularly and obliquely through the liquid crystal cell 1. This can suppress the reversal of brightness in halftones in a multi-gradation-level display and thereby makes it possible to stably display a correct gradation in the multi-gradation-level display even if the visual angle changes.

Note that although the first and second twist-aligned retardation plates 14 and 15 have opposite twist directions and the same twist angle in twist orientation of molecules in the above second embodiment, the twist angles need not be the same but may be different.

3rd Embodiment

In the third embodiment of the present invention, two twist-aligned retardation plates both having positive $\Delta n.d$ values are arranged one on each side of a liquid crystal cell 1.

Figure 7:
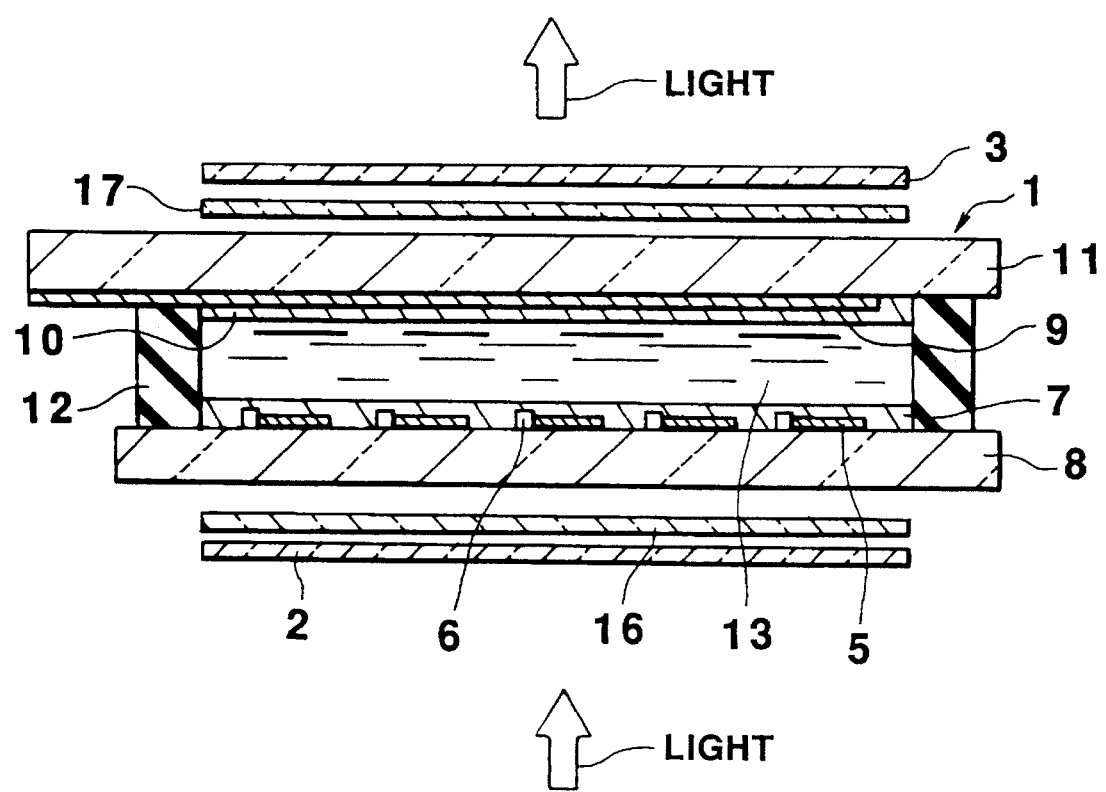
FIG. 7 is a sectional view showing a liquid crystal display device according to the third embodiment of the present invention.
Figure 8:
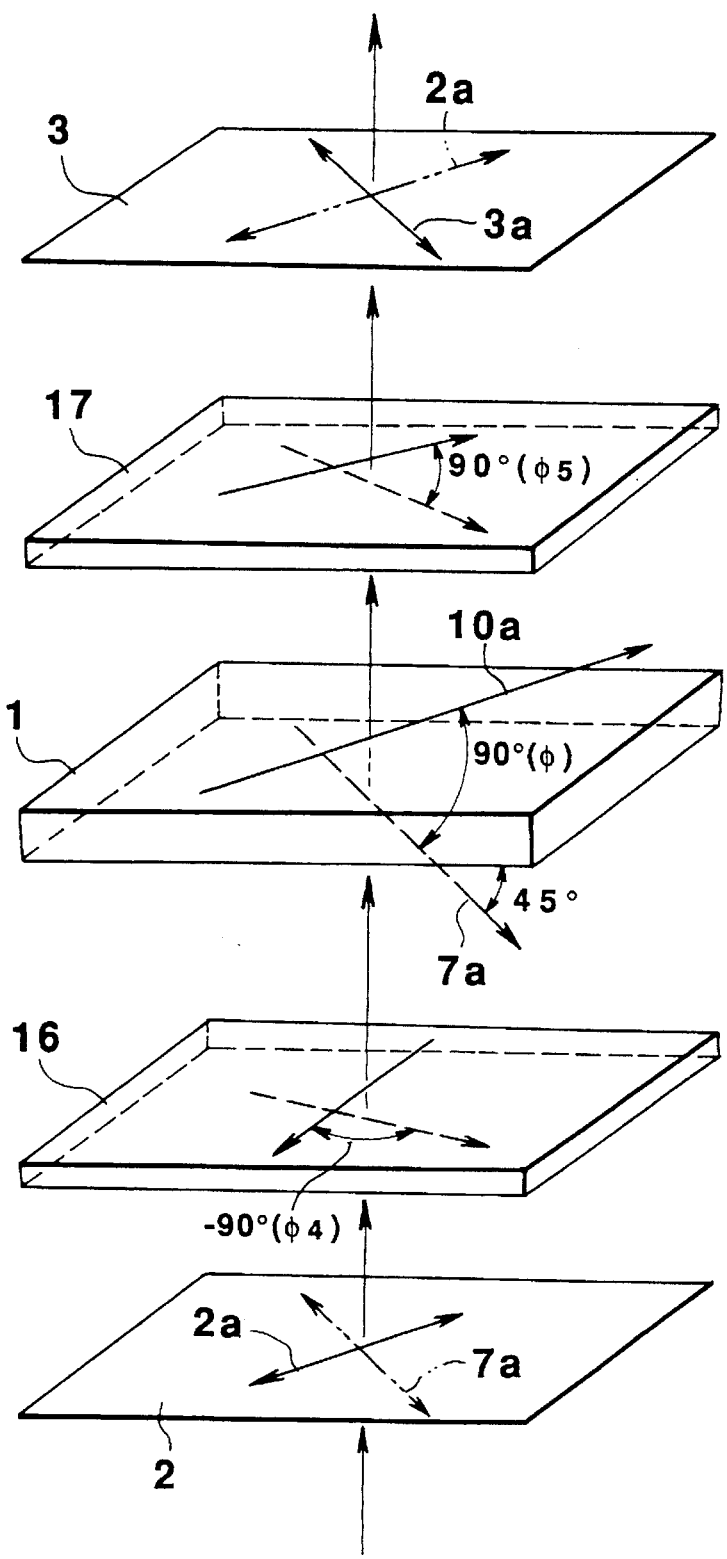
FIG. 8 is an exploded perspective view showing the liquid crystal display device of the third embodiment shown in FIG. 7.

FIGS. 7 and 8 are a sectional view and an exploded perspective view, respectively, showing a liquid crystal display device according to the third embodiment. In this liquid crystal display device, a polarizer 2 is arranged on the incident side of a twisted nematic type liquid crystal cell 1, and an analyzer 3 is arranged on the exit side of the liquid crystal cell 1. A first twist-aligned retardation plate 16 is arranged between the liquid crystal cell 1 and the polarizer 2, and a second twist-aligned retardation plate 17 is arranged between the liquid crystal cell 1 and the analyzer 3.

Referring to FIG. 8, the first twist-aligned retardation plate 16 arranged on the light-incident side consists of an organic polymer film in which the arrangement of molecules is twist-aligned by 90° ($\phi_4=-\phi=-90°$) in a direction opposite to the twist direction of liquid crystal molecules of a liquid crystal material 13. For example, the first twist-aligned retardation plate 16 has a structure in which a polymer liquid crystal film (liquid crystal polymer) is sandwiched between protective films consisting of cellulose triacetate (TAC) or the like. In this first twist-aligned retardation plate 16, a product Δn.d of a refractive index anisotropy Δn and a gap d ranges from 50 to 600 nm, preferably 100 to 600 nm (measurement wavelength: 589 nm).

The second twist-aligned retardation plate 17 on the light-exit side consists of an organic polymer film in which the arrangement of molecules is twist-aligned by 90° ($\phi_s = -\phi_4 = 90°$) in the same direction as the twist direction of the liquid crystal molecules of the liquid crystal material 13. Similar to the first twist-aligned retardation plate 16, the second phase plate 17 has a structure in which a polymer liquid crystal film (liquid crystal polymer) is sandwiched between protective films consisting of cellulose triacetate (TAC) or the like. In this second twist-aligned retardation plate 17, as in the first twist-aligned retardation plate 16, a product Δn.d of a refractive index anisotropy Δn and a gap d ranges between 50 and 600 nm, preferably 100 and 600 nm (measurement wavelength: 589 nm).

In this TN type liquid crystal display device with the above arrangement, the first and second twist-aligned retardation plates 16 and 17 are arranged between the liquid crystal cell 1 and the polarizer 2 and between the liquid crystal cell 1 and the analyzer 3, respectively, and therefore compensate for the differences in retardation between light components transmitted perpendicularly and obliquely through the liquid crystal cell 1. This can suppress the reversal of brightness in halftones in a multi-gradation-level display and can therefore stably display a correct gradation in the multi-gradation-level display even if the visual angle changes. In addition, each of the twist-aligned retardation plates 16 and 17 has the structure in which a polymer liquid crystal film in which the arrangement of molecules is twist-aligned over the range of 0° to ±360° is sandwiched between protective films. This facilitates the manufacture of the twist-aligned retardation plate and can also decrease the thickness of the plate, thereby achieving miniaturization of the overall liquid crystal display device.

Note that although the first and second twist-aligned retardation plates 16 and 17 have the same twist angle in twist orientation of molecules in the above third embodiment, the twist angles need not be the same but may be different. Note also that a transmission axis 2a of the polarizer 2 is set perpendicularly to an incident-side orientation direction 7a, but the transmission axis 2a can also be set parallel to the incident-side orientation direction 7a.

4th Embodiment

In the fourth embodiment of the present invention, a twist-aligned retardation plate with a negative Δn.d value is arranged in the structure of the first embodiment.

Figure 9:
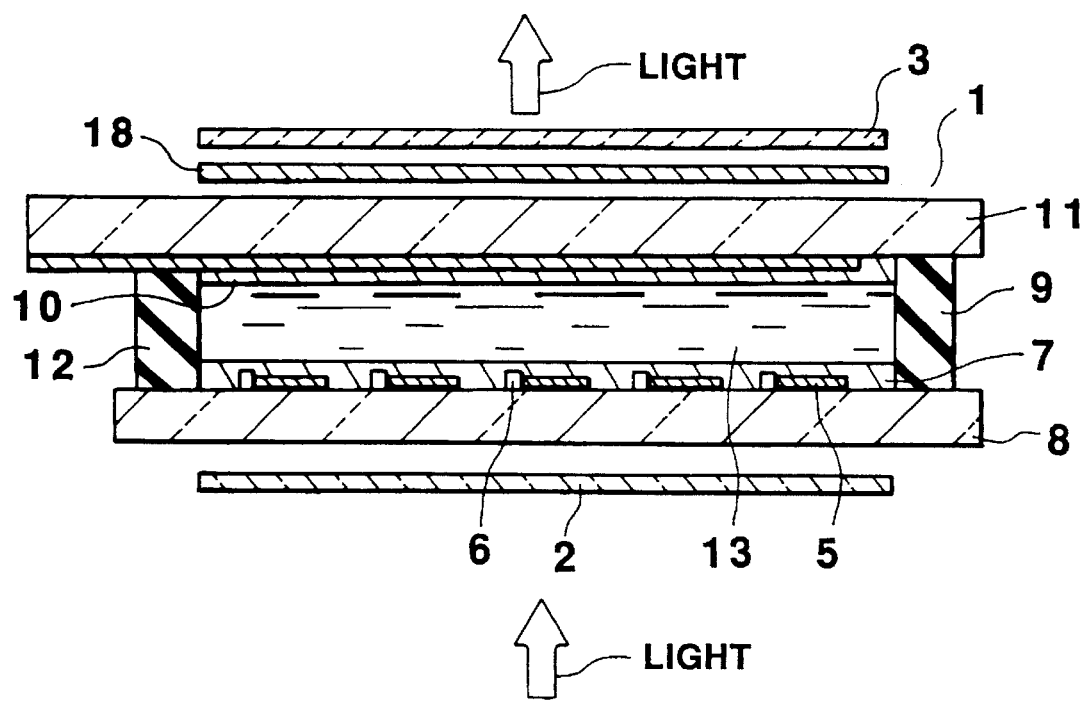
FIG. 9 is a sectional view showing a liquid crystal display device according to the fourth embodiment of the present invention.
Figure 10:
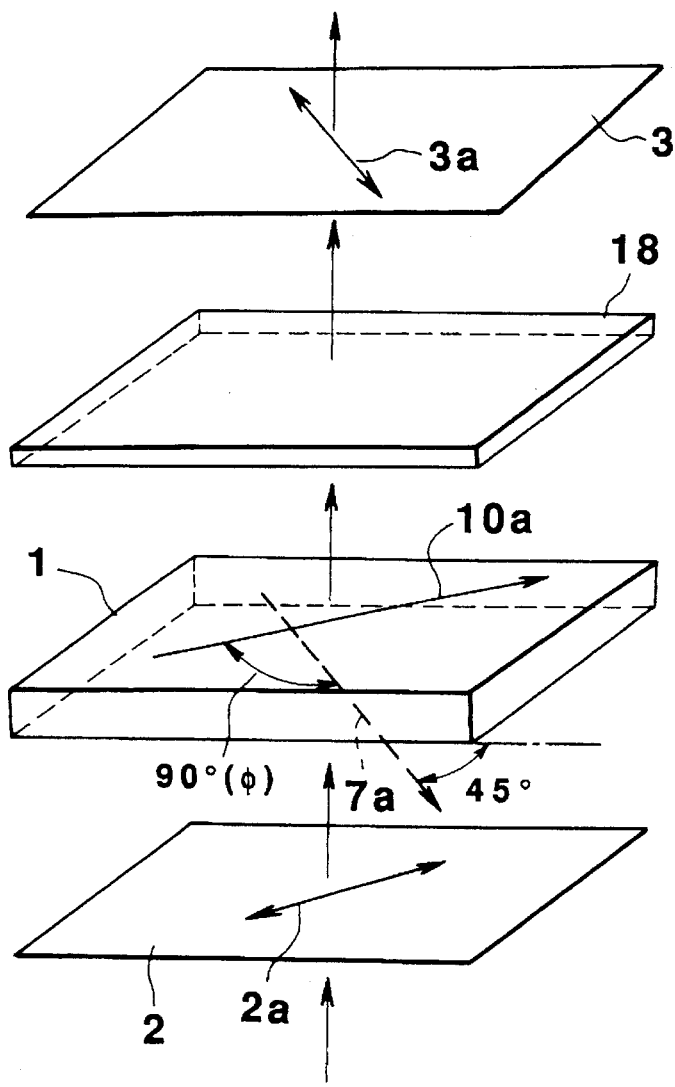
FIG. 10 is an exploded perspective view showing the liquid crystal display device of the fourth embodiment shown in FIG. 9.

FIGS. 9 and 10 are a sectional view and an exploded perspective view, respectively, showing a liquid crystal display device according to the fourth embodiment. In this liquid crystal display device, a polarizer 2 is arranged on the incident side of a twisted nematic type liquid crystal cell 1 having the same arrangement as the first embodiment, and an analyzer 3 is arranged on the exit side of the liquid crystal cell 1. A twist-aligned retardation plate 18 is arranged between the liquid crystal cell 1 and the analyzer 3.

Figure 11:
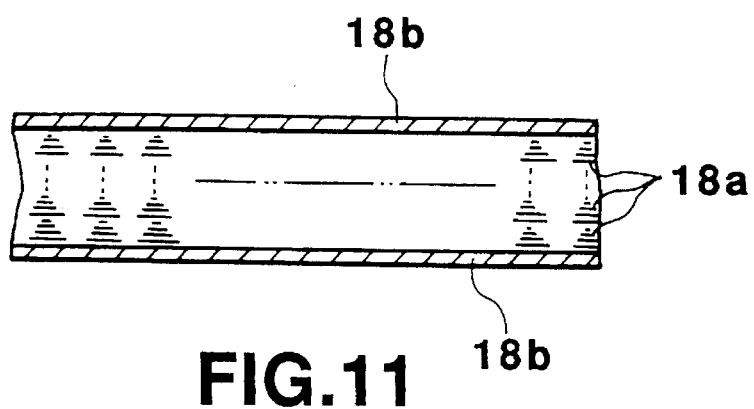
FIG. 11 is a schematic sectional view showing the structure of a twist-aligned retardation plate used in the fourth embodiment.

As shown in FIG. 11, the twist-aligned retardation plate 18 consists of an organic polymer film, in which molecules 18a are twist-aligned, and has a structure in which, for example, a polymer liquid crystal film (liquid crystal polymer) is sandwiched between protective films 18b consisting of cellulose triacetate (TAC) or the like. The molecules 18a of this twist-aligned retardation plate 18 are twist-aligned by five turns or more, preferably 10 to 15 turns, and the twist angle of this twist orientation is ±(d/p)×360° assuming that the thickness of the twist-aligned retardation plate 18 is d and the twist pitch is p. When the molecules are oriented while twisted by five turns, the twist angle is 360°×5=1, 800°. The value of an effective refractive index anisotropy ΔN of the twist-aligned retardation plate 18 is set negative. That is, assuming that the refractive index of the twist-aligned retardation plate 18 with respect to extraordinary rays is $n_e$ and its refractive index with respect to ordinary rays is $n_o$, the effective refractive index anisotropy ΔN of the twist-aligned retardation plate 18 is represented by:

$$\Delta N = n_o - \sqrt{\{(n_e^2 + n_o^2)/2\}} \tag{1}$$

When the twist pitch p is sufficiently smaller than a wavelength λ of incident light, ΔN in Equation (1) above is negative. In the twist-aligned retardation plate 18 of this embodiment, the twist pitch p is set to be smaller than ⅓ the wavelength at the lower limit of a visible light band, and so ΔN is negative. In addition, the value of a product ΔN.d of the effective refractive index anisotropy ΔN and a thickness d of the twist-aligned retardation plate 18 is set within a range of −30 to −600 nm (measurement wavelength: 589 nm).

It is also necessary to prevent coloring in the twist-aligned retardation plate 18 which is caused due to selective reflection of incident light, and the condition for achieving this purpose is represented by Inequality (2) below. In this case, the range of the wavelength λ of visible light is between 0.4 and 0.7 μm. Therefore, assuming that the average refractive index of the twist-aligned retardation plate 18 is $n_{av}$, the twist pitch p of the twist-aligned retardation plate 18 must satisfy:

$$p < (0.4/n_{av}) \text{ or } p > (0.7/n_{av}) \tag{2}$$

for $n_{av} = (n_e + n_o)/2$

In order to prevent coloring derived from selective reflection of incident light, the twist pitch p of the twist-aligned retardation plate 18 is so set as to satisfy the condition $p < (0.4/n_{av})$ in Inequality (2).

In the TN type liquid crystal display device with the above arrangement, the twist-aligned retardation plate 18 meeting the above condition is arranged between the liquid crystal cell 1 and the analyzer 3 and therefore cancels out the differences in retardation between light components transmitted perpendicularly and obliquely through the liquid crystal cell 1. This can suppress the reversal of brightness in halftones in a multi-gradation-level display and therefore can stably display a correct gradation in the multi-gradation-level display even if the visual angle changes. In this case, since the twist pitch p of the twist-aligned retardation plate 18 is sufficiently smaller than the wavelength λ of incident light, the value of the effective refractive index anisotropy ΔN of the twist-aligned retardation plate 18 is negative. Since the twist pitch p of the twist-aligned retardation plate 18 is also smaller than $(0.4/n_{av})$ μm, coloring in the twist-aligned retardation plate 18 which is caused due to selective reflection of incident light can be prevented, and this further improves the display quality in the multi-gradation-level display. Furthermore, the twist-aligned retardation plate 18 has the structure in which a polymer liquid crystal film in which the arrangement of molecules is twist-aligned by about 10 to 15 turns is sandwiched between protective films.

This facilitates the manufacture of the twist-aligned retardation plate and can also decrease the thickness of the plate, thereby achieving miniaturization of the overall liquid crystal display device.

Note that although a transmission axis 2a of the polarizer 2 is set perpendicularly to an incident-side orientation direction 7a in the above embodiment, the transmission axis 2a can also be set parallel to the incident-side orientation direction 7a. Note also that the twist-aligned retardation plate 18 is arranged between the liquid crystal cell 1 and the analyzer 3, but the twist-aligned retardation plate 18 can also be arranged between the liquid crystal cell 1 and the polarizer 2.

5th Embodiment

In the fifth embodiment of the present invention, a twist-aligned retardation plate in which Δn.d is negative and molecules are oriented nearly perpendicularly with respect to the surface of the plate is arranged in the structure of the first embodiment.

Figure 12:
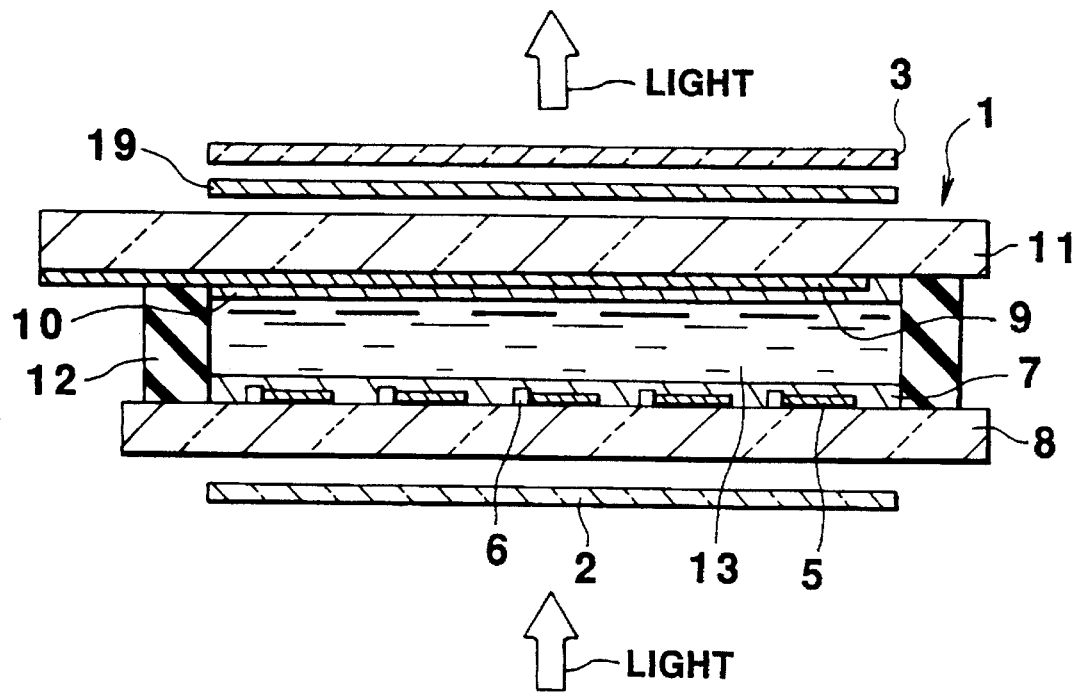
FIG. 12 is a sectional view showing a liquid crystal display device according to the fifth embodiment of the present invention.
Figure 13:
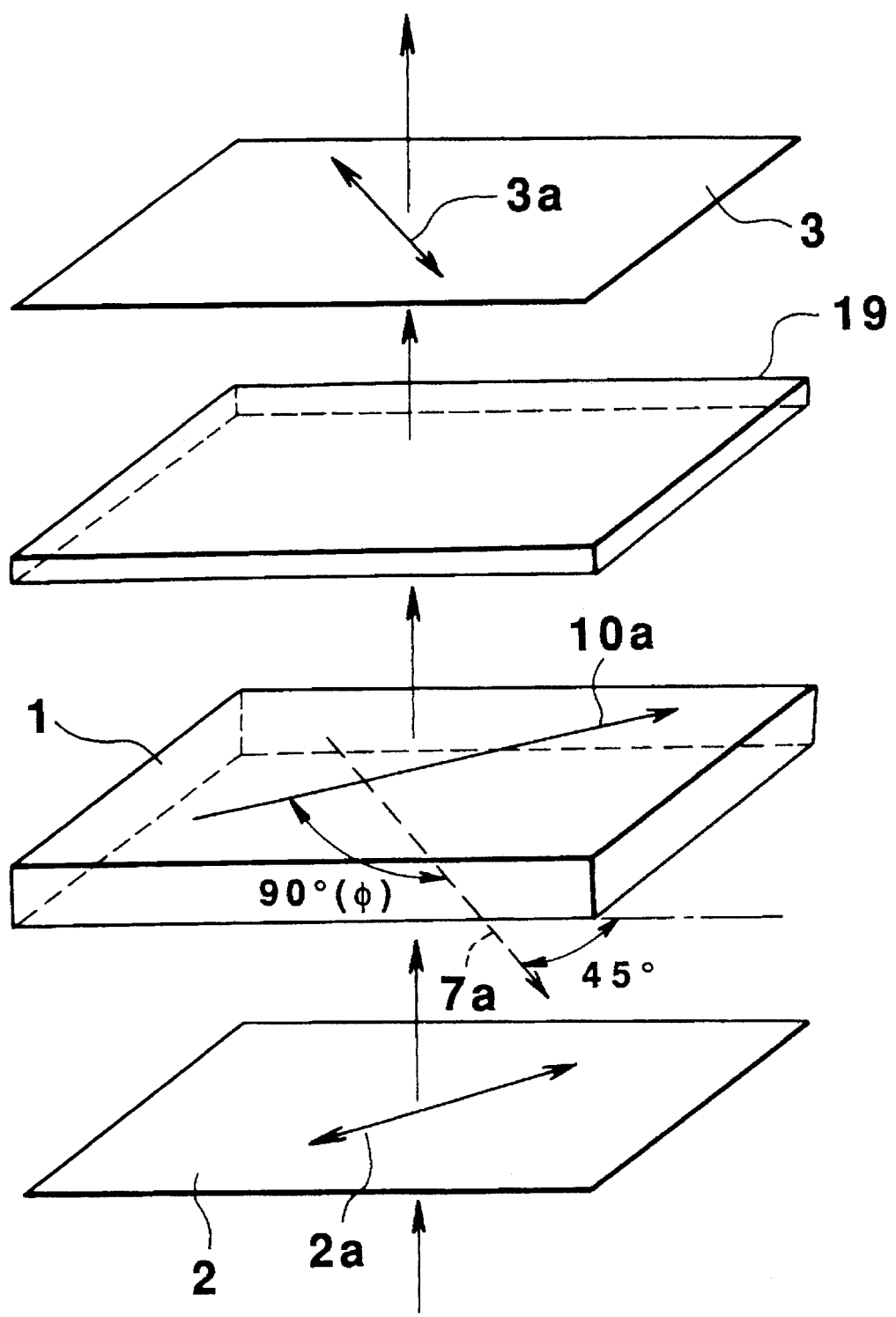
FIG. 13 is an exploded perspective view showing the liquid crystal display device of the fifth embodiment shown in FIG. 12.

FIGS. 12 and 13 are a sectional view and an exploded perspective view, respectively, showing a liquid crystal display device according to the fifth embodiment. A polarizer 2 constituted by a linear polarizing plate is arranged on the light-incident side of a twisted nematic type liquid crystal cell 1 having the same arrangement as the first embodiment, and an analyzer 3 also constituted by a linear polarizing plate is arranged on the light-exit side of the liquid crystal cell 1. A twist-aligned retardation plate 19 is arranged between the liquid crystal cell 1 and the analyzer 3.

Figure 14:
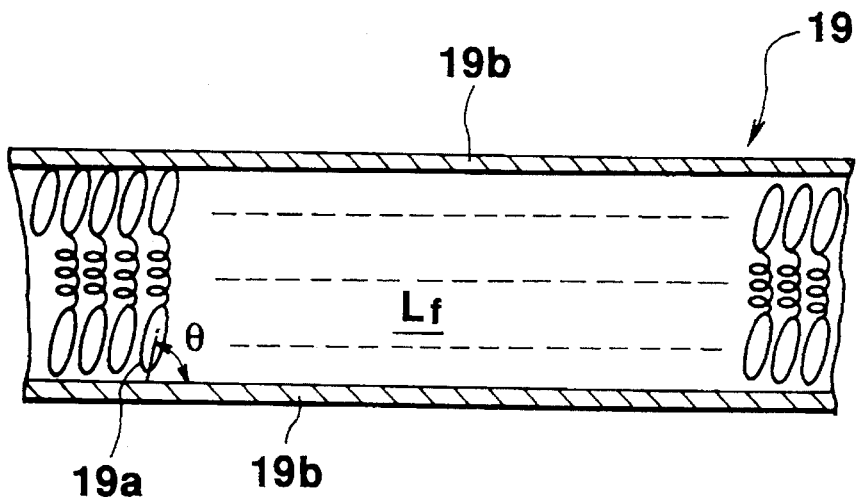
FIG. 14 is a schematic sectional view showing the structure of a twist-aligned retardation plate used in the fifth embodiment.

As schematically shown in FIG. 14, the twist-aligned retardation plate 19 consists of an organic polymer film in which molecules 19a are oriented while twisted by a plurality of turns in a state close to a homeotropic state with a pretilt angle θ of about 90° (θ<90°). For example, the twist-aligned retardation plate 19 has a structure in which a polymer liquid crystal film (liquid crystal polymer) $L_f$ is sandwiched between protective films 19b consisting of cellulose triacetate (TAC) or the like. Since the molecules are oriented while twisted by a plurality of turns, the value of Δn.d of this twist-aligned retardation plate 19 is negative (−). The other arrangement is the same as the first embodiment.

In the TN type liquid crystal display device with the above arrangement, the twist-aligned retardation plate 19 is arranged between the liquid crystal cell 1 and the analyzer 3 and therefore cancels out the differences in retardation between light components transmitted perpendicularly and obliquely through the liquid crystal cell 1. This can suppress the reversal of brightness in a halftone display and can therefore stably display a correct gradation even if the visual angle changes. In particular, since the molecules of the twist-aligned retardation plate 19 are oriented in a substantially homeotropic state in this embodiment, the differences in retardation in a dark-state display can be compensated for more reliably, preventing a leakage of light. This improves the contrast to result in better viewing angle characteristics. In addition, as shown in FIG. 14, the twist-aligned retardation plate 19 has the structure in which the polymer liquid crystal film $L_f$ in which the pretilt angle θ of the molecules 19a is approximately 90° is sandwiched between the protective films 19b. This facilitates the manufacture of the twist-aligned retardation plate 19 and can also decrease the thickness of the plate, thereby achieving miniaturization of the overall liquid crystal display device.

Note that although a transmission axis 2a of the polarizer 2 is set perpendicularly to an incident-side orientation direction 7a in the above embodiment, the transmission axis 2a can also be set parallel to the incident-side orientation direction 7a. Note also that the twist-aligned retardation plate 19 is arranged between the liquid crystal cell 1 and the analyzer 3, but the twist-aligned retardation plate 19 can also be arranged between the liquid crystal cell 1 and the polarizer 2.

6th Embodiment

In the sixth embodiment of the present invention, a twist-aligned retardation plate is arranged together with an STN liquid crystal display device.

Figure 15:
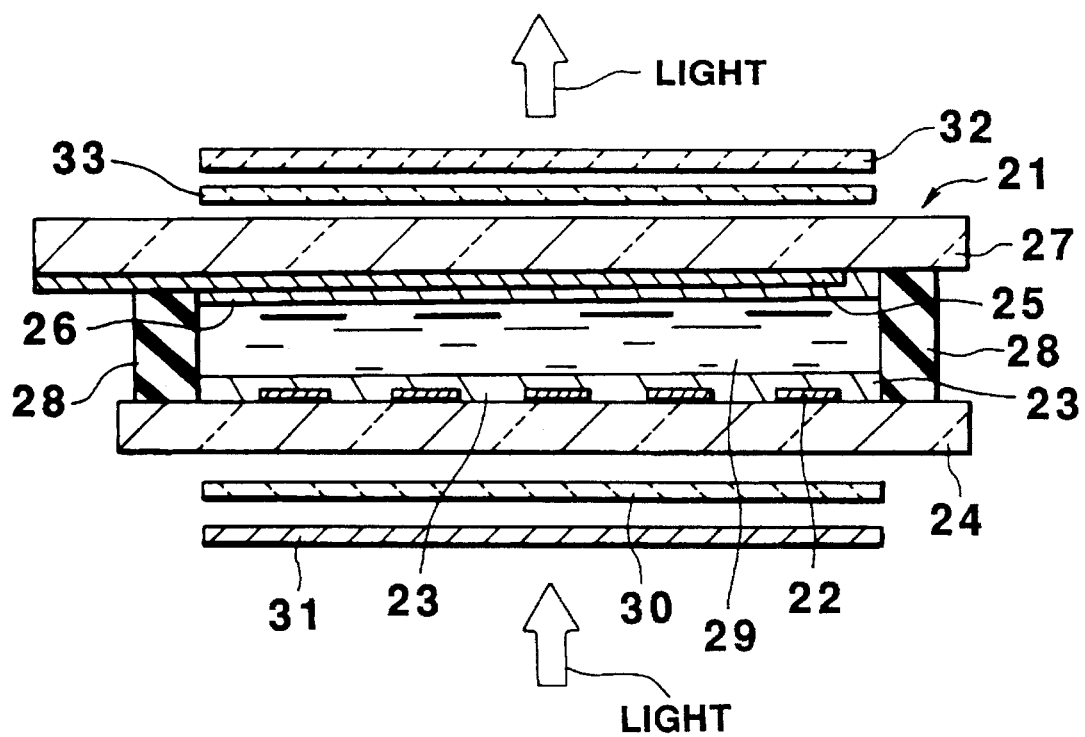
FIG. 15 is a sectional view showing a liquid crystal display device according to the sixth embodiment of the present invention.
Figure 16:
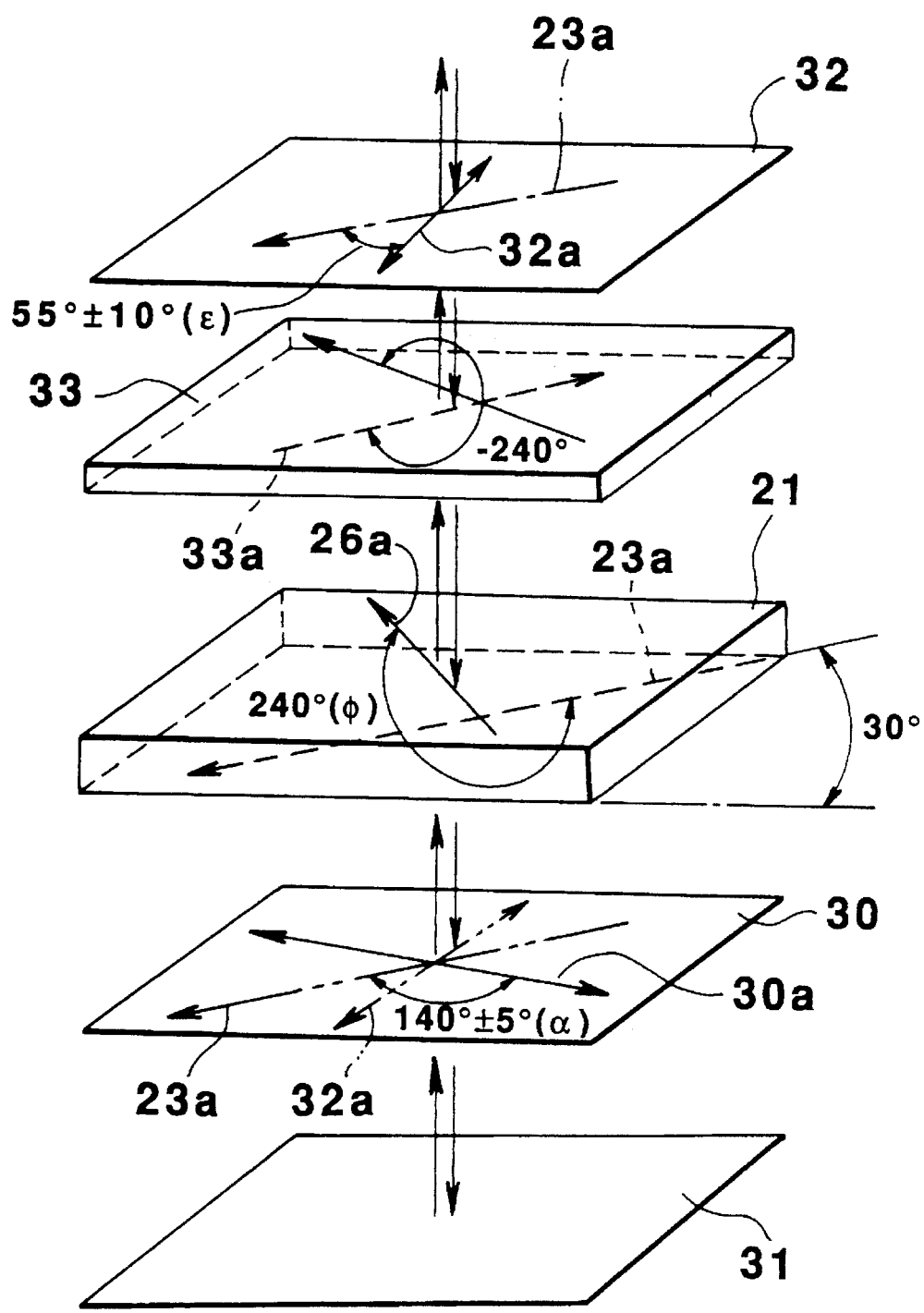
FIG. 16 is an exploded perspective view showing the liquid crystal display device of the sixth embodiment shown in FIG. 15.

FIGS. 15 and 16 are a sectional view and an exploded perspective view, respectively, showing a liquid crystal display device according to the sixth embodiment. Referring to FIGS. 15 and 16, a liquid crystal cell 21 comprises a lower substrate 24, an upper substrate 27, a seal member 28, and a liquid crystal material 29. The lower substrate 24 has electrodes 22 and an orientation film 23 covering these electrodes 22. The upper substrate 27 has counter electrodes 25 arranged to cross the electrodes 22 and an orientation film 26 covering the electrodes 25. The seal member 28 couples the lower and upper substrates 24 and 27 with a predetermined space between them. The liquid crystal material 29 is sealed in a region surrounded by the substrates 24 and 27 and the seal member 28.

A lower polarizing plate 30 constituted by a linear polarizing plate is arranged below the lower substrate 24, and a reflecting plate 31 is arranged below the lower polarizing plate 30. An upper polarizing plate 32 also constituted by a linear polarizing plate is arranged above the upper substrate 27. A twist-aligned retardation plate 33 is arranged between the upper substrate 27 and the upper polarizing plate 32.

The orientation films 23 and 26 formed on the opposing surfaces of the lower and upper substrates 24 and 27, respectively, are subjected to orientation processing, such as rubbing. That is, as shown in FIG. 16, the orientation film 23 of the lower substrate 24 is oriented in a direction 23a with a tilt angle of about 30° in a direction from the upper right to the lower left position with respect to the horizontal line when the liquid crystal cell 21 is viewed from the front. The orientation film 26 of the upper substrate 27 opposing the lower substrate 24 is oriented in a direction 26a which is rotated clockwise through 60° with respect to the orientation direction 23a of the lower substrate 24. With this orientation processing, the arrangement of liquid crystal molecules of the liquid crystal material 29 is twist-aligned counterclockwise through 240° (φ) in a direction from the lower substrate 24 to the upper substrate 27. The value of a product $\Delta n_c \cdot d_c$ of a gap $d_c$ and a refractive index anisotropy $\Delta n_c$ of the liquid crystal cell 21 is set within the range of 700 to 900 nm (measurement wavelength: 589 nm).

A transmission axis 30a of the lower polarizing plate 30 is set in a direction which is rotated counter-clockwise through 140°±5°(α) with respect to the orientation direction 23a on the side of the lower substrate. A transmission axis 32a of the upper polarizing plate 32 is set in a direction which crosses the orientation direction 23a at an angle of 55°±10 °(ε). That is, the transmission axis 32a of the upper polarizing plate 32 is set in a direction which is rotated clockwise through 85° from the transmission axis 30a of the lower polarizing plate 30.

The twist-aligned retardation plate 33 consists of an organic polymer film in which the arrangement of molecules is twist-aligned by 240° (−240°) in a direction opposite to the twist direction of the twist orientation of the liquid crystal molecules in the liquid crystal material 29. For example, the twist-aligned retardation plate 33 has a structure in which a polymer liquid crystal film (liquid crystal polymer) is sandwiched between protective films consisting of cellulose triacetate (TAC) or the like. The value of a product $\Delta n.d$ of a refractive index anisotropy $\Delta n$ and a thickness d of the twist-aligned retardation plate 33 is within the range of 0.9 to 0.95 times the value of the $\Delta n_c.d_c$ of the liquid crystal cell 21. The twist-aligned retardation plate 33 is arranged in a way which forms an angle of 90° between the orientation direction 26a on the side of the upper substrate of the liquid crystal cell 21 and a major-axis direction 33a of molecules on the surface of the twist-aligned retardation plate 33 adjacent to the upper substrate 27.

In the STN liquid crystal display device with the above arrangement, when light incident from the above and transmitted through the upper polarizing plate 32 is incident on and transmitted through the twist-aligned retardation plate 33, differences are produced between retardations of light components having different wavelengths by the twist-aligned retardation plate 33. However, these differences between retardations produced by the twist-aligned retardation plate 33 are canceled out when the light is incident on and transmitted through the liquid crystal cell 21. The consequent light is transmitted through the lower polarizing plate 30 and reflected by the reflecting plate 31. This reflected light is again transmitted upward through the lower polarizing plate 30 and produces differences between retardations of light components having different wavelengths when incident on and transmitted through the liquid crystal cell 21. These differences between retardations of light components having different wavelengths produced by the liquid crystal cell 21 are canceled out when the light is incident on and transmitted through the twist-aligned retardation plate 33. The resulting light is transmitted through the upper polarizing plate 32, so no coloring occurs in a display.

In this embodiment as described above, the twist-aligned retardation plate 33 in which the arrangement of molecules is twist-aligned at an angle of −240° is arranged between the STN liquid crystal cell 21, in which the liquid crystal material 29 is twist-aligned at an angle of 240°, and the upper polarizing plate 32. Therefore, the twist-aligned retardation plate 33 can almost compensate for the differences between retardations of light components having different wavelengths produced when light is transmitted through the liquid crystal cell 21, eliminating coloring in display. In this case, since the value of $\Delta n_c.d_c$ of the liquid crystal cell 21 is 700 to 900 nm and so the value of $\Delta n.d$ of the twist-aligned retardation plate 33 is 0.9 to 0.95 times the $\Delta n_c.d_c$ value of the liquid crystal cell 21, the twist-aligned retardation plate 33 can sufficiently compensate for the differences between retardations of light components having different wavelengths produced by the liquid crystal cell 21. In addition, the twist-aligned retardation plate 33 has the structure in which a polymer liquid crystal film in which the arrangement of molecules is twist-aligned at an angle of −240° is sandwiched between protective films. Therefore, the twist-aligned retardation plate can be manufactured easily and its thickness can be decreased. This improves the light transmittance and thereby increasing the contrast, and also promoting miniaturization of the overall liquid crystal display device. Furthermore, the color compensating effect can be further enhanced by setting an angle of 90° between the orientation direction 26a of the orientation film 26 of the upper substrate 27 of the liquid crystal cell 21 and the major-axis direction 33a of molecules of the twist-aligned retardation plate 33 adjacent to the upper substrate 27.

Note that although the twist-aligned retardation plate 33 is arranged between the liquid crystal cell 21 and the upper polarizing plate 32 in the above embodiment, the twist-aligned retardation plate 33 can also be arranged between the liquid crystal cell 21 and the lower polarizing plate 30. Note also that the present invention is applied to the reflecting liquid crystal display device in the above embodiment, but the invention is also applicable to a transmission liquid crystal display device. The present invention can also be applied to a color liquid crystal display device as well as a black-and-white liquid crystal display device.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:

a pair of substrates having surfaces which oppose each other and on which electrodes and orientation films covering said electrodes and having undergone orientation processing in predetermined directions are formed;

a nematic liquid crystal layer which is present between said orientation films and in which the arrangement of liquid crystal molecules is twist-aligned within a predetermined range of angles from one substrate to the other;

a pair of polarizing plates arranged outside said pair of substrates to sandwich said substrates; and at least one twist-aligned retardation plate which is arranged between said pair of polarizing plates and in which polymer molecules are oriented nearly perpendicular with respect to a surface of the plate and the arrangement of the polymer molecules is twist-aligned over a predetermined range of angles in a direction from one surface to the other.

2. A liquid crystal display device comprising:

a pair of substrates having surfaces which oppose each other and on which electrodes and orientation films covering said electrodes and having undergone orientation processing in predetermined directions are formed;

a nematic liquid crystal layer which is present between said orientation films and in which the arrangement of liquid crystal molecules is twist-aligned within a range of angles from 80° to 120° in a direction from one substrate to the other;

a pair of polarizing plates arranged outside said pair of substrates to sandwich said substrates; and two twist-aligned retardation plates which are arranged between said pair of polarizing plates and in which polymer molecules are arranged substantially parallel to each surface and the arrangement of the polymer molecules is twist-aligned in a predetermined range of angles in a direction from one surface to the other, each of said two twist-aligned retardation plates having a refractive index anisotropy $\Delta n$ and a plate thickness d, a product $\Delta n.d$ of which is positive, the polymer molecules of one of said two twist-aligned retardation plates being twist-aligned 80° to 120° in the same direction as the twist direction of the nematic liquid crystal layer, and the polymer molecules of the other twist aligned retardation plate being twist-aligned 80° to 120° in a direction opposite to the twist direction of the nematic liquid crystal layer.

3. A liquid crystal display device according to claim 2, wherein said two twist-aligned retardation plates are arranged between one of the polarizing plates and that of the substrates which opposes said one of the polarizing plates.

4. A liquid crystal display device according to claim 2, wherein one of said two twist-aligned retardation plates is arranged between one of the polarizing plates and the substrate which opposes said one of the polarizing plates, and the other of said two twist-aligned retardation plates is arranged between the other one of the polarizing plates and the other of the substrates which opposes said other one of the polarizing plates.

5. A liquid crystal display device comprising:
- a pair of substrates having surfaces which oppose each other and on which electrodes and orientation films covering said electrodes and having undergone orientation processing in predetermined directions are formed;
- a nematic liquid crystal layer which is present between said orientation films and in which the arrangement of liquid crystal molecules is twist-aligned within a predetermined range of angles in a direction from one substrate to the other;
- a pair of polarizing plates arranged outside said pair of substrates to sandwich said substrates; and
- at least two twist-aligned retardation plates which are arranged between said pair of polarizing plates and in which polymer molecules are arranged so as to be twist-aligned in a predetermined range of angles in a direction from one surface to the other, each of said twist-aligned retardation plates having a refractive index anisotropy $\Delta n$ and a plate thickness d, a product $\Delta n.d$ of which is positive.

6. A liquid crystal display device according to claim 5, wherein there are only two said twist-aligned retardation plates.

7. A liquid crystal display device according to claim 6, wherein said two twist-aligned retardation plates are arranged between one of the polarizing plates and the substrate which opposes said one of the polarizing plates.

8. A liquid crystal display device according to claim 6, wherein one of said two twist-aligned retardation plates is arranged between one of the polarizing plates and the substrate which opposes said one of the polarizing plates, and the other of said two twist-aligned retardation plates is arranged between the other one of the polarizing plates and the substrate which opposes said other one of the polarizing plates.

9. A liquid crystal display device according to claim 6, wherein the polymer molecules of one of said two twist-aligned retardation plates are twist-aligned 80° to 120° in the same direction as the twist direction of the nematic liquid crystal layer, and the polymer molecules of the other twist-aligned retardation plate are twist-aligned 80° to 120° in a direction opposite to the twist direction of the nematic liquid crystal layer.

10. A liquid crystal display device comprising:
- a pair of substrates having surfaces which oppose each other and on which electrodes and orientation films covering said electrodes and having undergone orientation processing in predetermined directions are formed;
- a nematic liquid crystal layer which is present between said orientation films and in which the arrangement of liquid crystal molecules is twist-aligned within a range of angles from 80° to 120° in a direction from one substrate to the other;
- a pair of polarizing plates arranged outside said pair of substrates to sandwich said substrates;
- at least one twist-aligned retardation plate which is arranged between said pair of polarizing plates and in which polymer molecules are twist-aligned a plurality of times in a direction from one surface to the other in which the twist pitch is set to be smaller than ⅕ the wavelength at the lower limit of a visible light band; and
- said twist-aligned retardation plate having an effective refractive index anisotropy $\Delta N$ expressed by $$\Delta N = n_o - \sqrt{(n_e^2 + n_o^2)/2} \ ,$$

assuming that $n_o$ is a refractive index with respect to ordinary rays and $n_e$ is a refractive index with respect to extraordinary rays and a plate thickness d, and wherein a product $\Delta N.d$ between $\Delta N$ and d is negative.

11. A liquid crystal display device according to claim 10, wherein said product $\Delta N.d$ is in the range of $-30$ to $-600$ nm, and said polymer molecules are twist-aligned at least five times.

12. A liquid crystal display device comprising:
- a pair of substrates having surfaces which oppose each other and on which electrodes and orientation films covering said electrodes and having undergone orientation processing in predetermined directions are formed;
- nematic liquid crystal layer which is present between said orientation films and in which the arrangement of liquid crystal molecules is twist-aligned within a range of angles from 80° to 120° in a direction from one substrate to the other;
- a pair of polarizing plates arranged outside said pair of substrates to sandwich said substrates; and
- two twist-aligned retardation plates which consist of an organic polymer film sandwiched between protective films and which are arranged between said pair of polarizing plates and in which polymer molecules are arranged substantially parallel to each surface, and the arrangement of the polymer molecules in one of said two twist-aligned retardation plates is twist-aligned in a range of angles from 80° to 120° in the same direction as the twist direction of the nematic liquid crystal layer, and the arrangement of the polymer molecules of the other twist-aligned retardation plate is twist-aligned in a range of angles from 80 ° to 120° in a direction opposite to the twist direction of the nematic liquid crystal layer.

13. A liquid crystal display device according to claim 12, wherein said two twist-aligned retardation plates are arranged between one of said pair of polarizing plates and one of said pair of substrates which opposes said one polarizing plate.

14. A liquid crystal display device according to claim 12, wherein one of said two twist-aligned retardation plates is arranged between one of said polarizing plates and one of said substrates which opposes said one polarizing plate, and the other twist-aligned retardation plates is arranged between the other polarizing plate and the other substrate which opposes the other polarizing plate.

15. A liquid crystal display device comprising:

a pair of substrates having surfaces which oppose each other and on which electrodes and orientation films covering said electrodes and having undergone orientation processing in predetermined directions are formed;

a nematic liquid crystal layer which is present between said orientation films and in which the arrangement of liquid crystal molecules is twist-aligned within a range of angles from 80° to 120° in a direction from one substrate to the other, said nematic liquid crystal layer having a refractive index anisotropy $\Delta n_c$ and a layer thickness $d_c$, a product $\Delta n_c \cdot d_c$ of which is 300 to 600 nm;

a pair of polarizing plates arranged outside said pair of substrates to sandwich said substrates; and two twist-aligned retardation plates for improving viewing angle characteristics, each said retardation plate consisting of an organic polymer film sandwiched between protective films and which are arranged between said pair of polarizing plates and in which polymer molecules are arranged substantially parallel to each surface, and the arrangement of the polymer molecules in one of said two twist-aligned retardation plates is twist-aligned in a range of angles from 80° to 120° in the same direction as the twist direction of the nematic liquid crystal layer, and the arrangement of the polymer molecules of the other twist-aligned retardation plate is twist-aligned in a range of angles from 80° to 120° in a direction opposite to the twist direction of the nematic liquid crystal layer, said retardation plate having a refractive index anisotropy $\Delta n$ and a plate thickness d, a product $\Delta n \cdot d$ of which is 50 to 600 nm.

16. A liquid crystal display device according to claim 15, wherein a product $\Delta n \cdot d$ of a refractive index anisotropy $\Delta n$ and a plate thickness d of said twist-aligned retardation plate is positive, and the arrangement of the molecules of said twist-aligned retardation plate is twist-aligned in a direction opposite to the twist direction of the twist arrangement of said nematic liquid crystal layer at the same twist angle.

17. A liquid crystal display device according to claim 15, wherein said two twist-aligned retardation plates are arranged between one of said pair of polarizing plates and one of said pair of substrates which opposes said one polarizing plate.

18. A liquid crystal display device according to claim 15, wherein one of said two twist-aligned retardation plates is arranged between one of said polarizing plates and one of said substrates which opposes said one polarizing plate, and the other twist-aligned retardation plate is arranged between the other polarizing plate and the other substrate which opposes the other polarizing plate.

* * * * *